(12) United States Patent
Lim et al.

(10) Patent No.: US 11,645,194 B2
(45) Date of Patent: May 9, 2023

(54) SYSTEMS FOR ENTERPRISE-WIDE END-TO-END AUTOMATED SOFTWARE TESTING

(71) Applicant: BANK OF AMERICA CORPORATION, Charlotte, NC (US)

(72) Inventors: Kristie Kimery Lim, Jersey City, NJ (US); Raj Bardhan Anand, Indian Land, SC (US); Anjali Besley, Parkland, FL (US); Douglas Yong Song Cha, Charlotte, NC (US); Heidi Cooper, Austin, TX (US); Ravi Katare, Kendall Park, NJ (US); Salahuddin Khawaja, New York, NY (US); Adrienne Showell-Phillips, Hockessin, DE (US); Mahesh R. Thummala, Plainsboro, NJ (US); Adrian Villasenor, Whittier, CA (US); David Wayne Welch, Weddington, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 254 days.

(21) Appl. No.: 16/999,885

(22) Filed: Aug. 21, 2020

(65) Prior Publication Data
US 2022/0058112 A1    Feb. 24, 2022

(51) Int. Cl.
*G06F 11/00*   (2006.01)
*G06F 11/36*   (2006.01)
(Continued)

(52) U.S. Cl.
CPC ............ *G06F 11/3664* (2013.01); *G06F 8/30* (2013.01); *G06F 9/4843* (2013.01);
(Continued)

(58) Field of Classification Search
CPC ............ G06F 11/3668; G06F 11/3664; G06F 11/3688; G06F 11/3692
See application file for complete search history.

(56) References Cited

U.S. PATENT DOCUMENTS 9,135,150 B2    9/2015  Rumble
9,396,160 B1 *  7/2016  Aithal ................. G06F 11/3668
(Continued)

*Primary Examiner* — Marc Duncan
(74) *Attorney, Agent, or Firm* — Moore & Van Allen PLLC; James C. Edwards

(57) ABSTRACT

An end-to-end automated testing platform that allows for standardized, enterprise-wide process, compliance and operational exposure testing. The testing platform is self-service, in that, users can manage the process by which (i) data sources are identified and data connections established, (ii) data is mapped from the data sources to meet test requirements, (iii) schedules for executing the test are established, and (iv) rules sets are established as the baseline for testing criteria. In addition, the platform provides for definition of the business rule logic to be used to perform the testing, application of the rule logic against appropriate business data to determine testing results and the dissemination of those results. Additionally, the platform provides for automated generation of test code, execution of the test code and compilation and dissemination of test results. Moreover, the testing platform provides for surveillance dashboards that allows for users to monitor tests currently in-progress and track results of completed tests.

20 Claims, 5 Drawing Sheets

(51) Int. Cl.
  G06F 8/30 (2018.01)
  G06N 5/04 (2023.01)
  G06F 9/48 (2006.01)
  G06N 20/00 (2019.01)

(52) U.S. Cl.
  CPC ...... G06F 11/3684 (2013.01); G06F 11/3688 (2013.01); G06F 11/3692 (2013.01); G06N 5/04 (2013.01); G06N 20/00 (2019.01)

(56) References Cited

U.S. PATENT DOCUMENTS

| | | | |
|---|---|---|---|
| 10,033,766 | B2 | 7/2018 | Gupta et al. |
| 10,162,740 | B1 * | 12/2018 | Setty ................... G06F 9/44505 |
| 10,541,867 | B2 | 1/2020 | Velupillai |
| 11,308,504 | B2 * | 4/2022 | Bs ....................... G06F 11/3664 |
| 2015/0339213 | A1 | 11/2015 | Lee et al. |
| 2017/0357927 | A1 * | 12/2017 | Antonio ..................... G06F 8/30 |
| 2020/0241872 | A1 * | 7/2020 | Muddakkagari .......... G06F 8/77 |
| 2020/0348926 | A1 * | 11/2020 | Rakshit ..................... G06F 8/70 |
| 2021/0232393 | A1 * | 7/2021 | Muddakkagari .... G06F 11/3664 |

* cited by examiner

SYSTEMS FOR ENTERPRISE-WIDE END-TO-END AUTOMATED SOFTWARE TESTING

FIELD OF THE INVENTION

The present invention relates to testing, and more particularly, to systems, methods, computer program products and the like for generating, managing and executing end-to-end automated process, compliance and operational exposure testing across an enterprise.

BACKGROUND

Many large enterprises need to ensure that both internal guidelines and external regulations are satisfied. For example, financial institutions are tasked with ensuring that they comply with both internal standards and government implemented rules and regulations. As a means of providing such insurance, these large enterprises perform ongoing process, compliance and operational exposure testing to determine if compliance issues exist and, if so, provide necessary corrective actions.

Currently many, if not most, of these tests involve some form of manual processing. In this regard, in many instances the tests are generated manually and/or include some form of manual execution. In large enterprise, which may have a need to implement thousands of process, compliance and operational exposure tests on a daily basis, manual intervention in the test process is inefficient and costly.

In addition, in a large enterprise with a high volume of testing requirements across many diverse business units, lines-of-business and the like, inconsistencies in the testing process from one business unit to the next are problematic. Inconsistencies are not only related to how the tests are performed/executed but also how and where test data is acquired, how the test data is stored and managed, how the tests are scheduled, how results are generated and presented and how issues are resolved.

Therefore, a need exists to develop systems, methods, computer program products and the like that provide an end-to-end automated process for process, compliance and operational exposure testing. The desired systems, methods, computer program products and the like should provide for automating all facets of the process, compliance and operational exposure test process including, but not limited to, configuring a test, generating the test, executing the test and presenting and providing results of the test. In addition, the desired systems, methods and computer program products should provide for standardizing testing, such that many, if not all, of the facets of the test process are consistent across the entire enterprise. Additionally, a need exists to develop systems, methods, computer program products and the like that allow an enterprise, conducting a high volume of process, compliance and operational exposure tests on an ongoing basis, to monitor the performance of such testing in real-time, as well as, assess results of such tests.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for an end-to-end automated testing platform that allows for enterprise-wide process, compliance and operational exposure testing. Specifically, the present invention provides for a self-service testing platform that allows users to manage the process by which (i) data sources are identified and data connections established, (ii) data is mapped from the data source to meet test requirements, (iii) schedules for executing the test are established, and (iv) rules sets are established as the baseline for testing criteria. In addition, the testing platform provides for the definition of the business rule logic to be used to perform the testing, application of the rule logic against appropriate business data to determine testing results and the dissemination of those results. In addition, the testing platform provides for automated generation of test code, execution of the test code and compilation and dissemination of test results.

Additionally, according to specific embodiments of the invention, the testing platform provides for surveillance dashboards that are configured to allow users to monitor the progress of tests in-progress, as well as, obtain results of completed tests. Further, the testing platform is configured to track occurrences of errors resulting from any facet of the testing platform and provides for communication of alerts, as necessary, based on test results and/or errors.

By implementing the testing platform enterprise-wide, the present invention results in highly standardized generation, management, execution and results of process, compliance and operational exposure tests. However, the platform is also flexible enough to allow users to customize any facet of the testing process and provide logging and recordation of any such customization. For example, while results of tests may include standardized data points, metrics and the like, the test results may also include test-specific attributes and results, as required by the test-initiator/user.

A system for end-to-end automated generation, execution and monitoring of process, compliance and operational exposure tests defines first embodiments of the invention. The system includes a plurality of data sources configured to store data; for example, a plurality of applications configured to receive, process and store data.

The system additionally includes a computing apparatus including a memory, one or more processing devices in communication with the memory and a display in communication with at least one of the processing devices. Additionally, the system includes a self-service automated test configuration and management platform that is stored in the memory, executable by the one or more processing devices.

The platform includes a data source identifier and connection engine that is configured to, in response to receiving first inputs that select a test for automation and test data required to execute the test, identify at least one of the data sources that store the identified test data and establish one or more data connections to the at least one data source.

The platform further includes a data analysis and mapping engine configured to, in response to receiving (i) second inputs and (ii) the test data via the established data connections, analyze the test data and second inputs to map the test data, as received from the data source, to test requirements. Additionally, the platform includes a rules building engine configured to, in response to receiving third inputs, build/establish a rules set applicable to the test, including business rule logic used to perform the testing, application of the rule logic against appropriate business data to determine testing results and the dissemination of those results.

Further, the platform includes a test coding engine configured to generate computer code for executing the process, compliance or operational exposure test based on the rules set and the mapping of the test data to the test requirements. In addition, the platform includes a compliance code execution engine configured to execute the computer code to run the test on test data received from the established data connections.

Moreover, the platform includes a test monitoring and results engine configured to present, on the display, one or more surveillance dashboards that are configured to allow a user to monitor live progress and results of the test.

In specific embodiments of the system, the platform further includes a scheduler engine configured to, in response to receiving fourth inputs, determine a schedule for executing the test. In such embodiments of the invention, the rules building engine is further configured to build the rules set applicable to the test and based at least on the determined schedule.

In other specific embodiments of the system, the platform further includes an Artificial Intelligence (AI) engine configured to receive and analyze an output of the test to determine at least a portion of the results of the test and provide the at least a portion of the results to the test monitoring and results engine for display on the one or more surveillance dashboards.

In further specific embodiments of the system, the test is further defined as an inline test and the test data is further defined as real-time production data.

In additional specific embodiments of the system, the platform further includes an error tracking engine configured to receive signals that indicate an occurrence of an error occurring in any other engine within the platform and record the error in test-specific logs. In related embodiments of the system, the platform further includes an alert and notification engine configured to receive error indications from the error tracking engine and test results from the test monitoring and results engine, determine that an alert is required based on an error indication or test results, identify recipients of the alert and initiate communication of the alert to the identified recipients.

In other specific embodiments of the system, the test monitoring and results engine is configured to generate (i) first results for the test that are standardized across a plurality of tests managed by the platform, and (ii) second results that are specific to the test. Moreover, in additional embodiments of the system, the test monitoring and results engine is further configured to identify one or more Systems of Record (SOR) for storing the results of the test, format the results to meet requirements of the identified SOR and write the results of the test to the identified SOR.

In still further specific embodiments of the system, the platform provides for (i) standardized data connections to data sources for each test configured and managed by the platform, (ii) each rule set for each test to include standardized rules applicable to each test configured and managed by the platform, (iii) standardized coding and execution of each test executed by the platform, and (iv) standardized reporting of results of each test configured and managed by the platform.

A computer-implemented method for configuring and managing process, compliance and operational exposure tests defines second embodiments of the invention. The method is executed by one or more processing devices. The method includes, in response to receiving first inputs that select a process, compliance and/or operational exposure test for automation and test data required to execute the test, identifying at least one data source that stores the identified test data and establishing a data connection each of the at least one data source. In addition the method includes, in response to receiving second inputs and the test data via the established data connections, analyzing the test data and second inputs to map the test data as received from the data source to test requirements. Further, the method includes in response to receiving third inputs, building a rules set applicable to the test. In addition, the method includes generating computer code for executing the test based on the rules set and the mapping of the test data to the test requirements and executing the computer code to run the test on the test data received from the one or more established data connections. Moreover, the method includes presenting, on a display, one or more surveillance dashboards that are configured to allow a user to monitor live progress and results of the test.

In further embodiments the method includes, in response to receiving fourth inputs, determining a schedule for executing the test. In such embodiments of the method building the rules set further includes building the rules set applicable to the test and based at least on the determined schedule.

In other specific embodiments the method includes receiving and analyzing, by an artificial intelligence engine, an output of the test to determine at least a portion of the results of the test and providing the at least a portion of the results for display on the one or more surveillance dashboards.

In still further specific embodiments of the method the process, compliance and/or operational exposure test is further defined as an inline test and the test data is further defined as real-time production data.

Moreover, in other specific embodiments the method includes receiving signals that indicate an occurrence of an error and record the error in test-specific logs. In other specific embodiments the method includes generating (i) first results for the test that are standardized across a plurality of tests managed by the platform, and (ii) second results that are specific to the test.

A computer program product including non-transitory computer-readable medium defines third embodiments of the invention. The computer-readable medium includes a first set of codes configured to cause a computer processor to, in response to receiving first inputs that select a test for automation and test data required to execute the test, identify at least one data source that stores the identified test data and establish a data connection each of the at least one data source. In addition, the computer-readable medium includes a second set of codes for causing a computer processor to, in response to receiving second inputs and the test data via the established data connections, analyze the test data and second inputs to map the test data as received from the data source to test requirements. Further, the computer-readable medium includes a third set of codes for causing a computer processor to, in response to receiving third inputs, build a rules set applicable to the test In addition, the computer-readable medium includes a fourth set of codes for causing a computer processor to generate computer code for executing the test based on the rules set and the mapping of the test data to the test requirements and a fifth set of codes for causing a computer processor to execute the computer code to run the test on the test data received from the one or more established data connections. Moreover, the computer-readable medium includes a sixth set of codes for causing a computer processor to present, on a display, one or more surveillance dashboards that are configured to allow a user to monitor live progress and results of the test.

In specific embodiments of the computer program product, the computer-readable medium further includes a seventh set of codes for causing a computer processor to receive and analyze, by an artificial intelligence engine, an output of the test to determine at least a portion of the results of the test and providing the at least a portion of the results for display on the one or more surveillance dashboards.

In other specific embodiments of the computer program product, the process, compliance and/or operational exposure test is further defined as an inline test and the test data is further defined as real-time production data.

In other specific embodiments of the computer program product, the computer-readable medium further comprises a seventh set of codes for causing a computer processor to receive signals that indicate an occurrence of an error and record the error in test-specific logs.

In additional specific embodiments of the computer program product, the computer-readable medium further comprises a seventh set of codes for causing a computer processor to generate (i) first results for the test that are standardized across a plurality of tests managed by the platform, and (ii) second results that are specific to the test.

Thus, systems, apparatus, methods, and computer program products herein described in detail below provide for an end-to-end automated testing platform that allows for standardized, enterprise-wide process, compliance and/or operational exposure testing. As described below embodiments of the invention are defined by a self-service testing platform that allows users to manage the process by which (i) data sources are identified and data connections established, (ii) data is mapped from the data source to meet test requirements, (iii) schedules for executing the test are established, and (iv) rules sets are established as the baseline for testing criteria. Additionally, the platform provides for business rule logic used to perform the testing, and applied against appropriate business data to determine testing results and the dissemination of those results. In addition, the testing platform provides for automated generation of test code, execution of the test code and compilation and dissemination of test results. Additionally, the platform provides for automated generation of test code, execution of the test code and compilation and dissemination of test results. Moreover, the testing platform provides for surveillance dashboards that allows for users to monitor tests currently in-progress, as well as, track results of completed tests.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
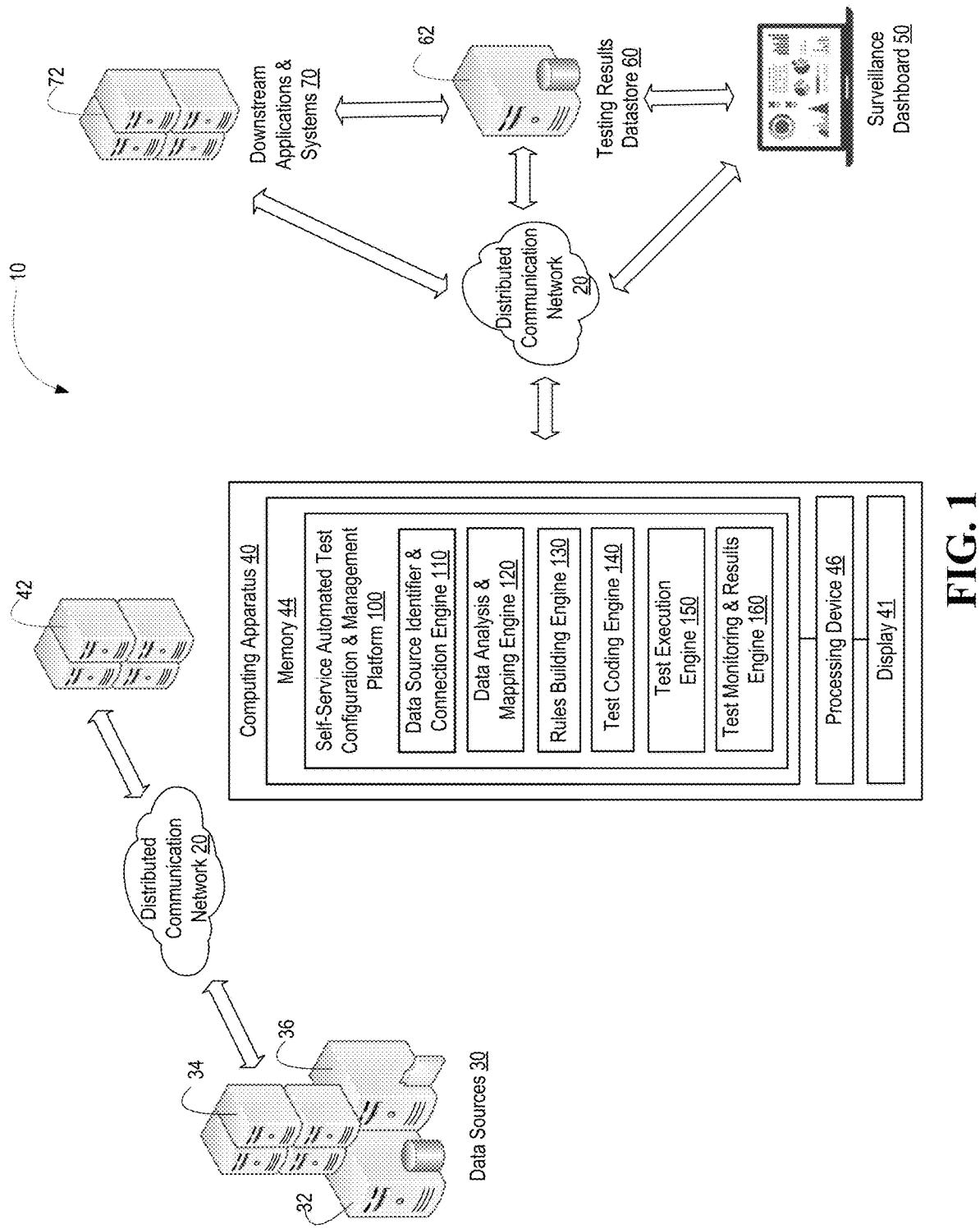
Figure 2:
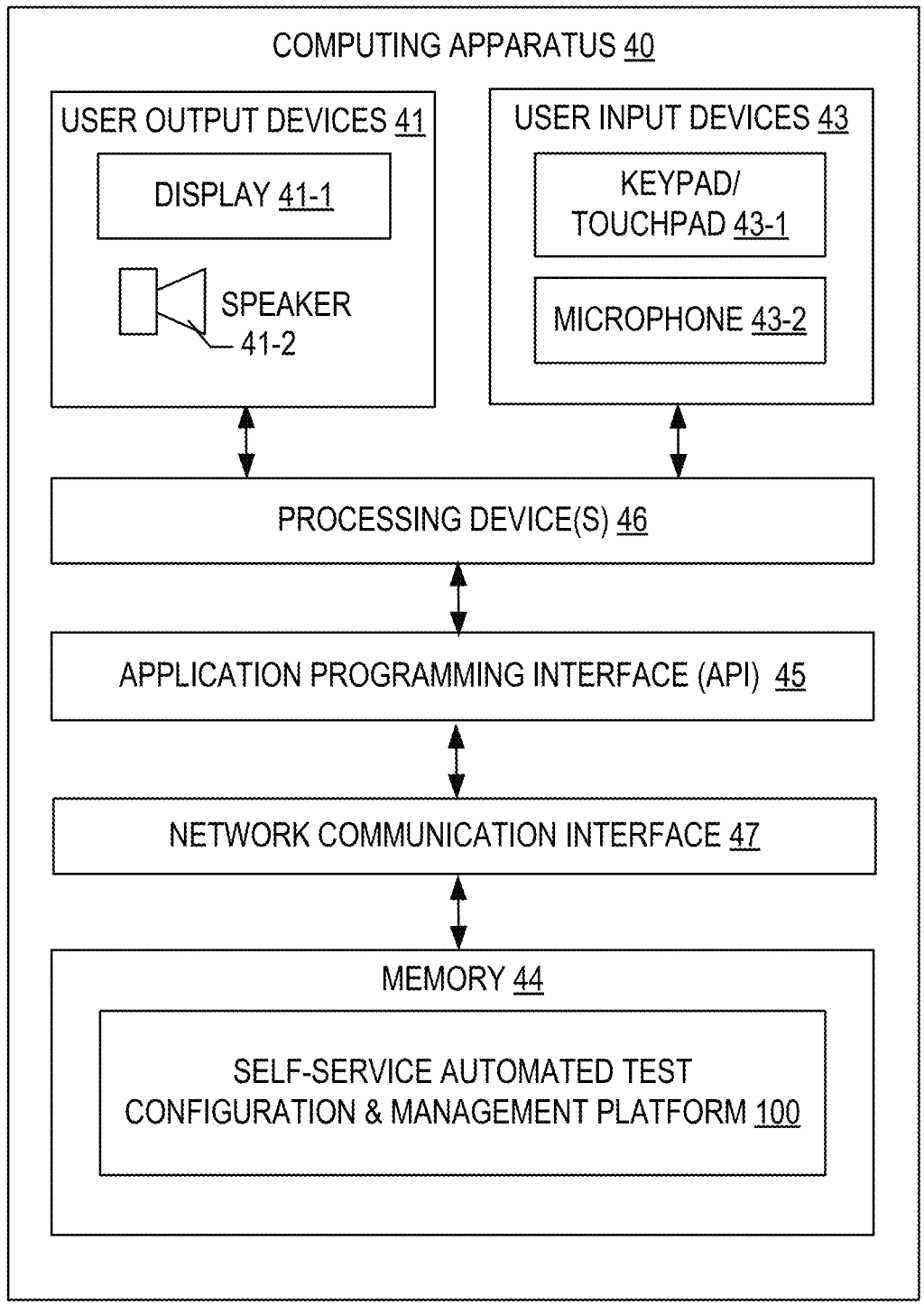
Figure 3:
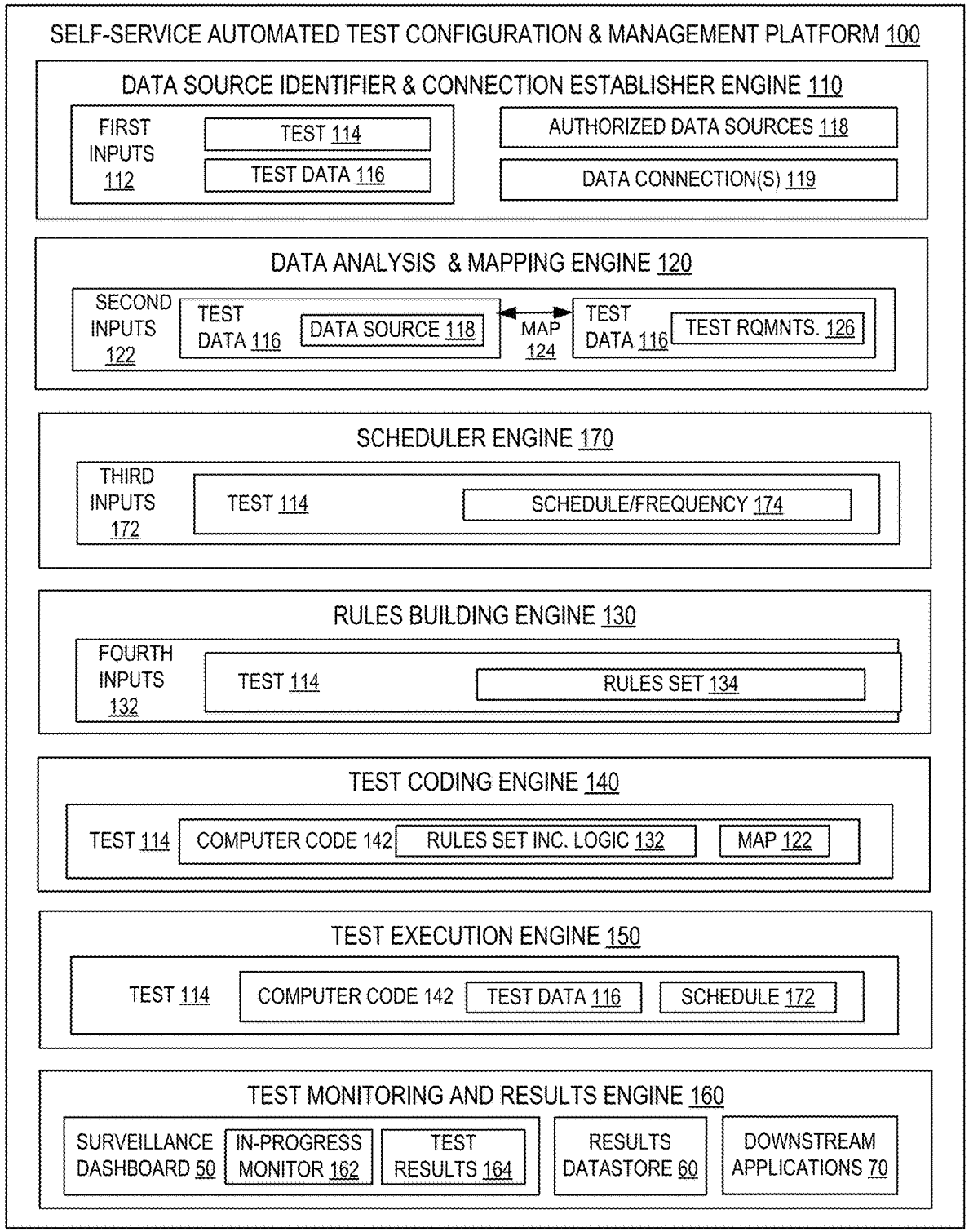
Figure 4:
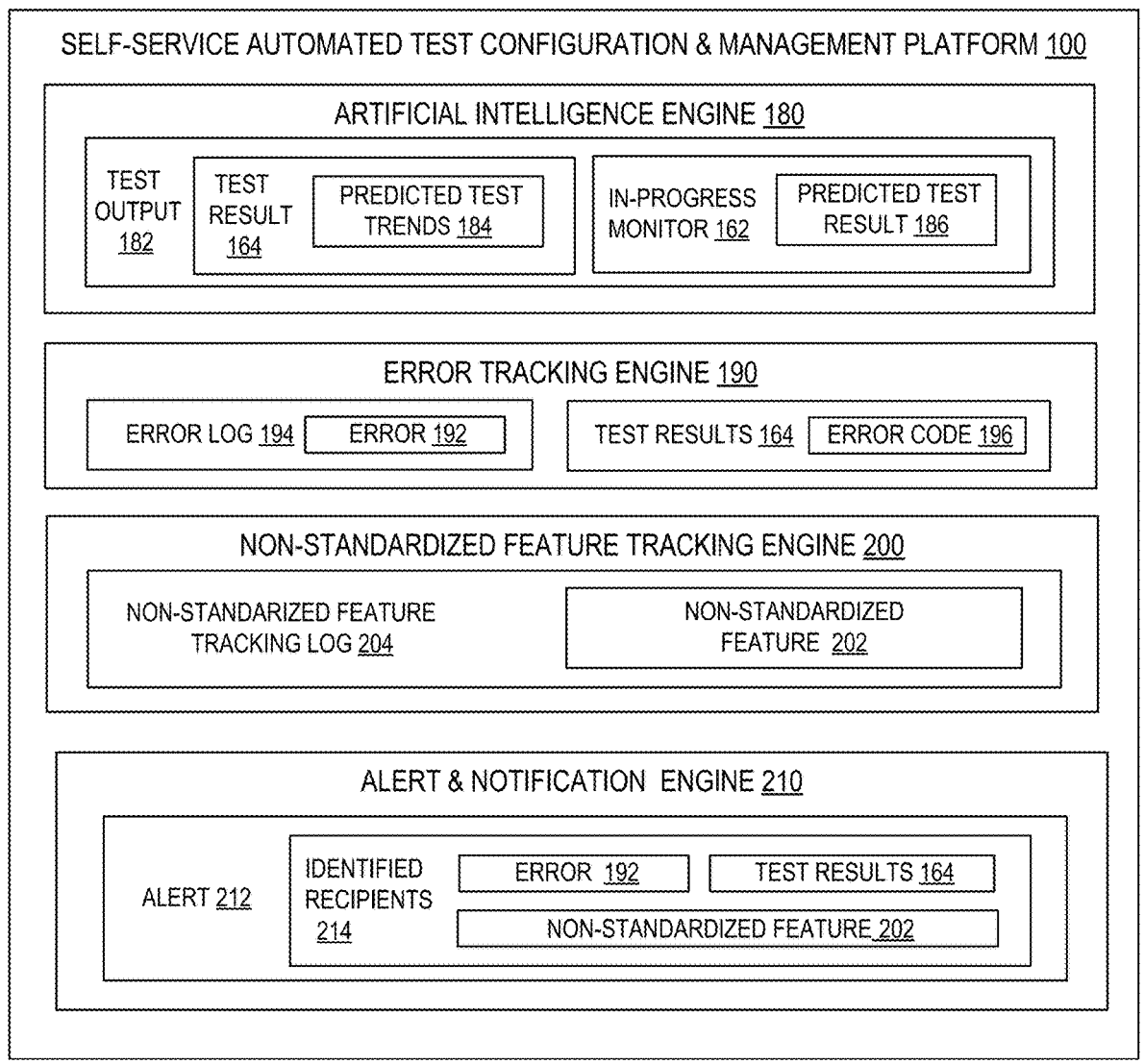
Figure 5:
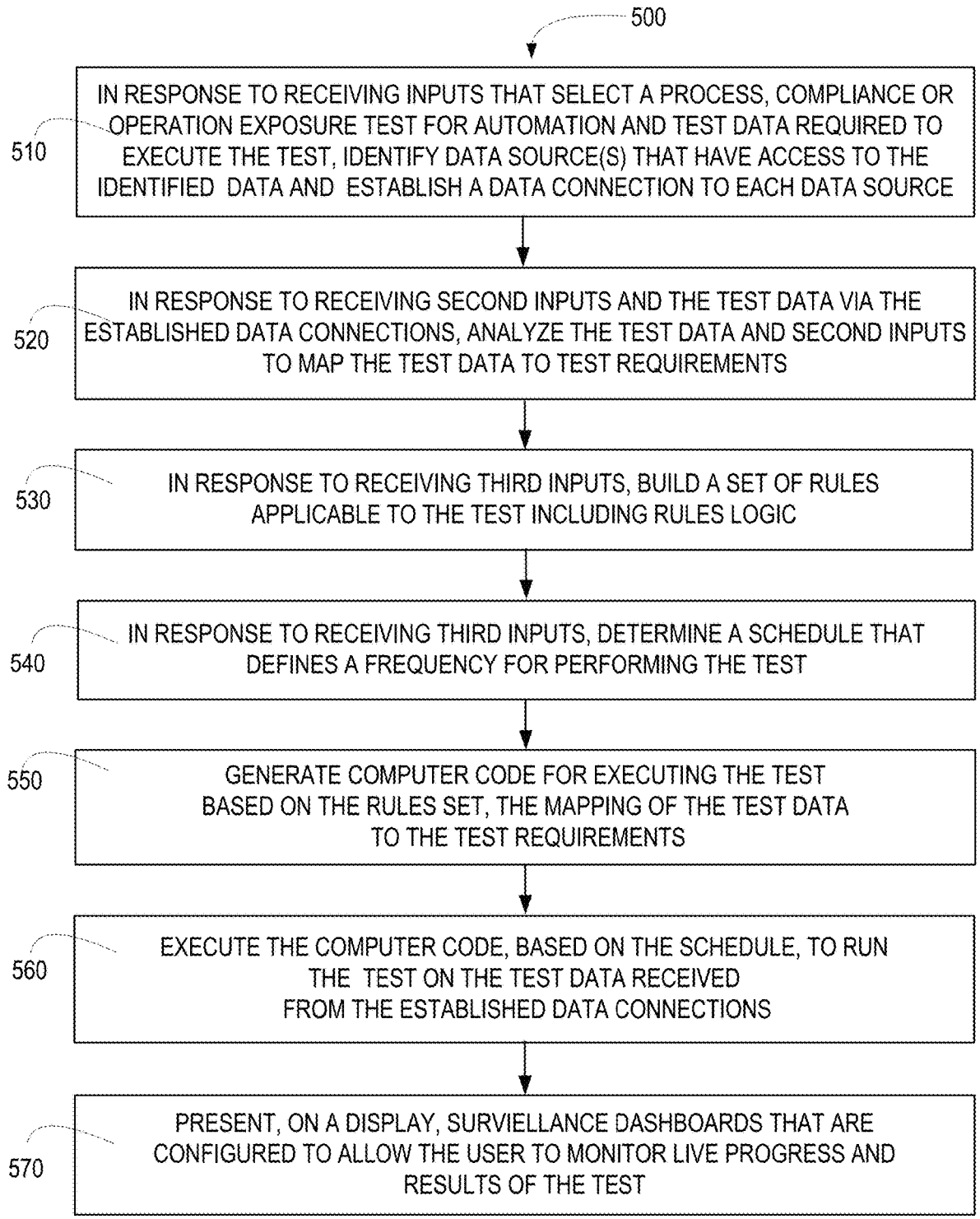

Having thus described embodiments of the invention in general terms, reference will now be made the accompanying drawings, wherein:

FIG. 1 is a schematic/block diagram of a system for end-to-end automated configuration, generation and management of process, compliance and operational exposure tests, in accordance with embodiments of the present disclosure;

FIG. 2 is a block diagram of computing apparatus including a self-service automated test configuration and management platform, in accordance with embodiments of the present invention;

FIGS. 3 and 4 are block diagrams of a self-service automated test configuration and management platform, in accordance with embodiments of the present invention; and FIG. 5 is a flow diagram of method for end-to-end automated configuration, generation and management of process, compliance and operational exposure tests, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as PYTHON, JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, as described in more detail below, embodiments of the present invention provide for an end-to-end automated testing platform that allows for enterprise-wide process, compliance and/or operational exposure testing. Specifically, the present invention provides for a self-service testing platform that allows users to manage the process by which (i) data sources are identified and data connections established, (ii) data is mapped from the data source to meet test requirements, (iii) schedules for executing the test are established, and (iv) rules sets are established as the baseline for testing criteria. In addition, the platform generates business rule logic used to perform the testing and applies the rule logic against appropriate business data to determine testing results and to determine how and to whom results should be disseminated. In addition, the testing platform provides for automated generation of test code, execution of the test code and compilation and dissemination of test results. In addition, the testing platform provides for automated generation of test code, execution of the test code and compilation and dissemination of test results.

Specific, embodiments of the invention are directed to a process, compliance and operational exposure testing platform. Compliance testing as used herein refers to any test that serves to ensure that internal and/or external rules and regulations are adhered to. For example, in those embodiments of the invention in which the testing platform is implemented by a financial institution, the financial institution has many processes that must meet both internal and external (i.e., government) rules and regulations. Such testing by financial institutions or the like is required to be thorough and extensive, i.e., anywhere above or around from 5,000 to 20,000 tests executed by variable frequency or the like across various different processes and/or applications.

Additionally, according to specific embodiments of the invention, the automated configuration, generation and management testing platform provides for surveillance dashboards that are configured to allow users to monitor the progress of tests as they are being executed, as well as, obtain results of completed tests. Further, the testing platform is configured to track occurrences of errors resulting from any facet of the testing platform and provides for communication of alerts, as necessary, based on test results and/or errors.

By implementing the testing platform enterprise-wide, the present invention results in highly standardized configuration, generation, and management of tests. However, the platform is also flexible enough to allow users to customize any facet of the testing process and provide logging and recordation of any such customization. For example, while test results may include standardized data points, metrics, test code errors, dashboard displays and the like, the test results may also include test-specific attributes and results, as required by the test-initiator/user.

Turning now to the figures, FIG. 1 illustrates a system 10 for end-to-end automated configuration, generation and management of testing, such as process, compliance and operational exposure testing, in accordance with embodiments of the present invention. The system is implemented within a distributed communication network 20, which may comprise the Internet, one or more intranets and combinations thereof. The system 10 includes data sources 30 which store or otherwise have access to data that requires testing. In the illustrated example of FIG. 1 the data sources 30 include database servers 32, application servers 34, file servers 36 and the like. The system additionally includes a computing apparatus 40, which may include one or more computing devices, such as application server(s) 42 or the like. The computing apparatus includes a memory 44, at least one processing device 46 in communication with the memory and a display 41 in communication with the processing device 46.

The memory 44 of computing apparatus 40 stores self-service automated test configuration and management platform 100. The platform 100 allows for users to provide inputs and, in response perform various automated tasks as described herein. As depicted in FIG. 1 the platform 100 includes various engines. An "engine" as used herein is a software component, which may include modules, routines, algorithms or the like, that is configured to perform defined functions, actions or tasks. While the platform 100 as described includes various engines, it should be noted that the platform may include more or less engines/software components. For example, functions, actions, task defined herein as being performed by individual engines may, in practice, be consolidated within other engines.

Platform 100 includes data source identifier and connection establishment engine 110 that is configured to, in response to identifying a test for automation and the data required for the identified test, identify at least one data source that stores or otherwise has access to the data and establish a data connection with the data source. The engine 110 is further configured to verify that identified data sources 110 are authenticated for purposes of providing test data. In large enterprise, in which data is being processed by a large volume of applications, identifying which applications are applicable to a give task and subsequently establishing connections to the applications and the corresponding hardware (i.e., servers or the like) in an automated manner is highly efficient in terms of reducing manual processing.

Platform 100 additionally includes data analysis and mapping engine 120 that is configured to, in response to receiving inputs, such as, user inputs and data from the established data connections, analyze the data to provide a mapping of the data from the data sources to the test requirements. In this regard, the data sources/applications typically store the data in various tables within a file/database and, specific data elements, within columns of such tables. The present invention is configured to map the locations within the various tables/columns of the data source files to meet the requirements of the test. Moreover, data analysis may include properly formatting the data to meet the requirements of the test.

In addition, platform 130 includes rules building engine 130 that is configured to, in response to receiving inputs, such as user inputs, build a set of rules for the test. The rules may be based on various business rules and external entity rules (i.e., government agencies) that are required of the applicable test. The set of rules define the functions necessary to perform the test. Additionally, the rules building engine 130 generates business rule logic that is used to perform the testing and is applied against appropriate business data to determine testing results and the semantics for dissemination of those results. In addition, the testing platform provides for automated generation of test code, execution of the test code and compilation and dissemination of test results. Additionally, platform 130 includes a test coding engine 140 that is configured to generate computer code for executing the test based on the rules set and the mapping of test data to test requirements. In specific embodiments of the invention, generation of the computer code is fully automated, while in other embodiments of the invention, the generation of the computer code is semi-automated, requiring some inputs from a user (i.e., computer coder/programmer) or the like.

Further, platform 100 includes test execution engine 150 that is configured to execute the computer code to run the test using the test data as received from the one or more established data connections. In specific embodiments of the invention, the computer code is executed in-line with one or more corresponding applications, such that, the test is executed on live data as the data is being processed by the applications. In addition, test execution 150 is configured to execute the computer code in accordance with specified schedules. As discussed in relation to FIGS. 3 and 5, infra., in specific embodiments of the invention, platform 100 may include a scheduler engine configured to determine a schedule/frequency for executing the test.

Moreover, platform 100 includes test monitoring and results engine 160 that is configured to present, on display 41, one or more surveillance dashboards 50 that are configured to allow the user to monitor live progress of tests currently executing and results of tests that have completed. Further, engine 160 is configured to store results in testing results datastore 60 and/or communicate the results to downstream applications and systems 70.

Referring now to FIG. 2, a block diagram is provided of computing apparatus 40, which, as previously discussed, may comprise one or more computing devices/components, such as servers, personal computers (PCs) and the like. Computing apparatus 40 includes input devices 41, user output devices 43, memory 44, application programming interface 45, processing device 46 and network communication interface 47. User input devices 43 may include keypad/touchpad 43-1, microphone 43-2 or any other input device configured to receive user inputs to platform 100. User output devices 41 may include display 41-1, speaker 41-2 or any other output device configured to provide a user the platform 100 and the surveillance dashboards 50.

Memory 44 may comprise volatile and non-volatile memory, such as read-only and/or random-access memory (RAM and ROM), EPROM, EEPROM, flash cards, or any memory common to computing platforms). Moreover, memory 44 and the like may comprise cloud storage, such as provided by a cloud storage service and/or a cloud connection service. Processing device 46 or the like may be an application-specific integrated circuit ("ASIC"), or other chipset, logic circuit, or other data processing device. Processing device(s) 46 or the like may execute one or more application programming interface (APIs) 45 that interface with any resident programs, such as platform 100 or the like stored in the memory 44 of the computing apparatus 40 and any external programs. Processing device(s) 46 may include various processing subsystems (not shown in FIG. 2) embodied in hardware, firmware, software, and combinations thereof, that enable the functionality of the computing apparatus 40 and the operability of the computing apparatus 40 on a communications network (not shown in FIG. 2). For example, processing subsystems allow for initiating and maintaining communications and exchanging data with other networked devices. For the disclosed aspects, processing subsystems of computing apparatus 40 may include any processing subsystem used in conjunction with platform 100 and related engines, tools, routines, sub-routines, algorithms, sub-algorithms, sub-modules thereof.

Additionally, computing apparatus 40 includes network communication interface 47 that is operatively connected to the processing device(s) 46 and is configured to communicate with one or more other devices on the distributed communication network 20 (shown in FIG. 1). In this regard, the network communication interface 47 may include an antenna operatively coupled to a transmitter and a receiver (together a "transceiver"). The processing device 46 is configured to provide signals to and receive signals from the transmitter and receiver, respectively. The computing apparatus 40 may utilize a wired network and/or wireless network including satellite or any other wireless network of the device to provide signals and receive signals.

The memory 44 stores self-service automated test configuration, generation and management platform 100 which is configured to provide automated configuration, generation and management of tests, such as process, compliance and operational exposure tests for an enterprise. Further details related to platform 100 are discussed in relation to FIGS. 3 and 4, infra.

Referring to FIGS. 3 and 4, block diagrams are presented of a self-service automated test configuration, generation and management platform 100, in accordance with embodiments of the present invention. The platform includes a data source identifier and connection establisher engine 110 that is configured to, in response to receiving first inputs 112 that select a test 114 for automation and identify test data 116 for conducting the test 114, identify authorized data sources 118 that store or authorize have access to the test data 116 required to perform the selected test. In specific embodiments of the invention the selected test may provide for live in-line testing, such that testing is performed while associated applications are running (i.e., data is being processed). The authorized nature of the data sources 118 means that the data sources have been verified as authorized sources of the data (e.g., gold standard or most valid for an intended test).

In addition, data source identifier and connection establisher engine 110 is configured to establish or verify pre-existing data connections 119 with the data source 118 (i.e., connections to databases storing the data 116 and/or applications that process or have access to the data 116). In specific embodiments of the invention, establishing the data connections 119 includes configuring the hardware (i.e., ports and the like) and defining requisite protocols. In further specific embodiments of the invention, the data connections 119 are secure data connections, such as tunnel connections or the like.

Platform 110 additionally includes data analysis and mapping engine 120 that is configured to, in response to receiving second inputs 122, analyze the test data 116 received from the data sources 118 (via the established connections 119) to map 122 the test data 116 according to test requirements 124. Mapping 122 includes correlating locations (e.g., tables, columns, data elements and the like) at the data source 118 with testing requirements. In addition to mapping, analyzing the test data 120 may require re-formatting the test data 116 to meet the requirements of the test.

In addition, according to specific embodiments of the invention, platform 100 includes scheduler engine 170 that is configured to, in response to receiving third inputs, determine a schedule 172 for executing the test. Determining the schedule 172 may take into account various factors, such as compliance requirements, server/test data availability, stability of test results and the like. The schedule 172 may define testing intervals or specific test patterns (e.g., dates and time, days of the week, time of day or the like).

Platform 100 additionally includes rules building engine 130 that is configured to, in response to receiving fourth inputs 132, build a rules set 132 applicable for executing the test 114. The rules set 132 includes business rules that describe the boundaries for the test and take into account the internal and/or external guidelines, rules and regulations that dictate the need for the test. The rules set includes business rule logic used to perform the testing and to be applied against appropriate business data to determine testing results and the semantics for dissemination of those results. In addition, the testing platform provides for automated generation of test code, execution of the test code and compilation and dissemination of test results Additionally, the platform 100 includes test coding engine 140, that is configured to generate the computer code 142 for executing the test based at least on the rules set 132 and the mapping 122 of the test data 116 to the test requirements 124. As previously discussed, the test coding engine 140 may be fully automated or semi-automated in generating the computer code 142. Once the code has been generated, the platform stores the computer code 142 is an associated computer code repository (not shown in FIG. 3).

In addition, platform 100 includes test execution engine 150 that is configured to retrieve the test computer code 142 from the repository, retrieve test data 116 via the established or pre-existing data connections 119 and execute the computer code to run the test according to the defined schedule 172. In this regard, the tests are run on a fully automated basis with no manual intervention required.

Further, platform 100 includes test monitoring and results engine 160 that is configured to present, on a display device, one or more surveillance dashboards 50 that provide in-progress monitoring 162 of tests currently executing, as well as, results 164 of tests that have been completed. Further, test monitoring and results engine 160 is configured to communicate results 164 to results datastore 60 and/or downstream applications and systems 70. As previously discussed, certain aspects of the results 164 will be standardized across all test being executed by the platform 100. Standardized aspects may include, but are not limited to, data points, metrics, test codes, how and what is displayed in the surveillance dashboards and the like. Additionally, users may configure the tests to provide unique test-specific results (or the tests themselves may provide for unique test-specific results).

Referring to FIG. 4, the self-service automated test configuration, generation and management platform 100 additionally includes an artificial intelligence engine 180 that is configured to receive outputs of test 114 and implement artificial intelligence including machine learning techniques to determine test results 154 including predicted test trends 184 that indicate how results are trending and if they are approaching non-compliance thresholds. In addition, artificial intelligence engine 180 may be configured to implement artificial intelligence including machine learning techniques to determine in-progress monitoring 162 included predicted results 186 of the test in-progress that indicates predicts results for the currently executing test.

Moreover, platform 100 may include error tracking engine 190 that is configured to determine when an error occurs in any other engine, feature of the platform and, in response to determining the occurrence of an error 192, record the error in test-specific error logs 194 and provide the related error code 196 as part of the test results 164. Further, platform 100 may include non-standardized feature tracking engine 200 that is configured to determine when a user requests the platform to deviate from standardized features and record the non-standard feature 202 in a corresponding non-standardized feature log 204.

Further, platform 100 may include alert and notification engine 210 that is configured to receive (i) indications of errors 192, (ii) test results 164, and/or (iii) non-standard features 202, determine if the error 192, test results 164 or change from standardized feature 202 requires an alert 212 and, if so identify recipients 214 of the alert 212 and initiate communication of the alert 212 to the identified recipients 214.

Referring to FIG. 5, a flow diagram is depicted of a method 500 for self-service automated configuration, generation and management of tests, such as process, compliance and operational exposure tests, in accordance with embodiments of the present invention.

In response to receiving first inputs that select a process, compliance and/or operational exposure test for automation and the test data required for executing the identified test, at Event 510, (i) at least one data source is identified that stores or otherwise has access to the identified test data, and (ii) a data connection is established with each of the data sources or a pre-existing data connection to the data source is confirmed. Identifying the data source includes verifying that data sources are authenticated for purposes of providing test data (i.e., the data source stands as "the gold standard" for providing the data). Establishing the data connection provides for configuring the physical and/or virtual connections and, in some embodiments of the invention, establishing a secure data connections, such as tunnel connection, using an applicable tunneling protocol (e.g., IP in IP (Protocol 4); SIT/IPv6 (Protocol 41); Generic Routing Encapsulation (GRE) (Protocol 47); OpenVPN (UDP port 1194); Secure Socket Tunneling Protocol (SSTP) (TCP port 443); Internet Protocol Security (IPSec) (Protocol 50 and 51);

Layer 2 Tunneling Protocol (L2TP) (Protocol 115); Virtual Extensible Local Area Network (VXLAN) (UDP port 4789) or the like.

In response to receiving second inputs and the test data via the established or pre-existing data connections, at Event 520, the test data is analyzed to format and map the test data in accordance with test requirements. In this regard, the data sources/applications typically may store the data in one format, while the test requires the data in another format. In addition, the mapping provides for specific tables/columns in data source files data sources, which contain data elements applicable to the test to be mapped to meet test requirements.

In response to receiving third inputs, at Event 530, a set of test rules is built, including business rules and external entity rules (i.e., government agency) that are required of the applicable test. The set of rules define the functions necessary to perform the test. At Event 540, a schedule is determined that defines the frequency (e.g., hourly, daily, weekly or the like) at which the test is be executed/run.

At Event 550, computer code is generated for executing the test based on the rules set and the mapping of test data to test requirements. As previously discussed, in specific embodiments of the invention, generation of the computer code is fully automated, while in other embodiments of the invention, the generation of the computer code is semi-automated, requiring some inputs from a user (i.e., computer coder/programmer) or the like.

At Event 560, the computer code is executed, based on the determined schedule, to run the test using test data received from the established or pre-existing data connections. At Event 570, a user is presented with one or more surveillance dashboards that are configured to allow the user to monitor the live progress of tests currently executing and results of tests that have been completed. Further, the test results are communicated to any downstream applications and systems requiring or requesting the results of the tests.

As evident from the preceding description, the systems, methods and the like described herein represents an improvement in technology, specifically, embodiments of the present invention provide end-to-end automated configuration, generation and execution of tests, such as, process, compliance and operational exposure tests. A self-service testing platform has herein been described that allows users to manage the process by which (i) data sources are identified and data connections established, (ii) data is mapped from the data source to meet test requirements, (iii) schedules for executing the test are established, and (iv) rules sets are established as the baseline for testing criteria. Additionally, the platform provides for automated generation of test code, execution of the test code and compilation and dissemination of test results. Moreover, the testing platform provides for surveillance dashboards that allows for users to monitor tests currently in-progress, as well as, track results of completed tests.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for end-to-end automated generation and monitoring of process, compliance and operational exposure tests, the system comprising:
    a plurality of data sources configured to store data;
    a computing apparatus including a memory, one or more processing devices in communication with the memory and a display in communication with at least one of the processing devices;
    a self-service automated test configuration and management platform stored in the memory, executable by the one or more processing devices and comprising:
        a data source identifier and connection engine configured to, in response to receiving first inputs that select a test for automation and test data required to execute the test, identify at least one of the data sources that store the identified test data and establish one or more data connections to the at least one data source;
        a data analysis and mapping engine configured to, in response to receiving second inputs and the test data via the established data connections, analyze the test data and second inputs to map the test data as received from the data source to test requirements;
        a rules building engine configured to, in response to receiving third inputs, build a rules set applicable to the test including rule logic used to run the test and applied appropriate data to determine test results and the dissemination of the test results;
        a test coding engine configured to generate computer code for executing the test based on the rules set and the mapping of the test data to the test requirements;
        a compliance code execution engine configured to execute the computer code to run the test on the test data received from the one or more established data connections; and
        a test monitoring and results engine configured to present, on the display, one or more surveillance dashboards that are configured to allow a user to monitor live progress and results of the test.

2. The system of claim 1, wherein the platform further comprises:
    a scheduler engine configured to, in response to receiving fourth inputs, determine a schedule for executing the test,
    wherein the rules building engine is further configured to build the rules set applicable to the test and based at least on the determined schedule.

3. The system of claim 1, wherein the platform further comprises an artificial intelligence engine configured to receive and analyze an output of the test to determine at least a portion of the results of the test and provide the at least a portion of the results to the test monitoring and results engine for display on the one or more surveillance dashboards.

4. The system of claim 1, wherein the test is further defined as an inline test and the test data is further defined as real-time production data.

5. The system of claim 1, wherein the platform further comprises an error tracking engine configured to receive signals that indicate an occurrence of an error occurring in any other engine within the platform and record the error in test-specific logs.

6. The system of claim 5, wherein the platform further comprises an alert and notification engine configured to receive error indications from the error tracking engine and test results from the test monitoring and results engine, determine that an alert is required based on an error indication or test results, identify recipients of the alert and initiate communication of the alert to the identified recipients.

7. The system of claim 1, wherein the test monitoring and results engine is configured to generate (i) first results for the test that are standardized across a plurality of tests managed by the platform, and (ii) second results that are specific to the test.

8. The system of claim 1, wherein the test monitoring and results engine is further configured to identify one or more systems of record (SOR) for storing the results of the test, format the results to meet requirements of the identified (SOR) and write the results of the test to the identified SOR.

9. The system of claim 1, wherein the self-service automated test configuration and management platform provides for (i) standardized data connections to data sources for each test configured and managed by the platform, (ii) each rule set for each test to include standardized rules applicable to each test configured and managed by the platform, (iii) standardized coding and execution of each test executed by the platform, and (iv) standardized reporting of results of each test configured and managed by the platform.

10. A computer-implemented method for configuring and managing process, compliance and operational exposure tests, the method executed by one or more processing devices and comprising:

in response to receiving first inputs that select a test for automation and test data required to execute the test, identifying at least one data source that stores the identified test data and establishing a data connection to each of the at least one data source;

in response to receiving second inputs and the test data via the established data connections, analyzing the test data and second inputs to map the test data as received from the data source to test requirements;

in response to receiving third inputs, building a rules set applicable to the test including rule logic used to run the test and applied appropriate data to determine test results and the dissemination of the test results;

generating computer code for executing the test based on the rules set and the mapping of the test data to the test requirements;

executing the computer code to run the test on the test data received from the one or more established data connections; and presenting, on a display, one or more surveillance dashboards that are configured to allow a user to monitor live progress and results of the test.

11. The computer-implemented method of claim 10, further comprising:

in response to receiving fourth inputs, determining a schedule for executing the test, wherein building the rules set further comprises building the rules set applicable to the test and based at least on the determined schedule.

12. The computer-implemented method of claim 10, further comprising:

receiving and analyzing, by an artificial intelligence engine, an output of the test to determine at least a portion of the results of the test and providing the at least a portion of the results for display on the one or more surveillance dashboards.

13. The computer-implemented method of claim 10, wherein the test is further defined as an inline test and the test data is further defined as real-time production data.

14. The computer-implemented method of claim 10, further comprising:

receiving signals that indicate an occurrence of an error and record the error in test-specific logs.

15. The computer-implemented method of claim 10, further comprising:

generating (i) first results for the test that are standardized across a plurality of tests managed by the platform, and (ii) second results that are specific to the test.

16. A computer program product including non-transitory computer-readable medium that comprises:

a first set of codes configured to cause a computer processor to, in response to receiving first inputs that select a process, compliance or operational exposure test for automation and test data required to execute the test, identify at least one data source that stores the identified test data and establish a data connection each of the at least one data source;

a second set of codes for causing a computer processor to, in response to receiving second inputs and the test data via the established data connections, analyze the test data and second inputs to map the test data as received from the data source to test requirements;

a third set of codes for causing a computer processor to, in response to receiving third inputs, build a rules set applicable to the test including rule logic used to run the test and applied appropriate data to determine test results and the dissemination of the test results;

a fourth set of codes for causing a computer processor to generate computer code for executing the test based on the rules set and the mapping of the test data to the test requirements;

a fifth set of codes for causing a computer processor to execute the computer code to run the test on the test data received from the one or more established data connections; and a sixth set of codes for causing a computer processor to present, on a display, one or more surveillance dashboards that are configured to allow a user to monitor live progress and results of the test.

17. The computer program product of claim 16, wherein the computer-readable medium further comprises a seventh set of codes for causing a computer processor to receive and analyze, by an artificial intelligence engine, an output of the test to determine at least a portion of the results of the test and providing the at least a portion of the results for display on the one or more surveillance dashboards.

18. The computer program product of claim 16, wherein the test is further defined as an inline test and the test data is further defined as real-time production data.

19. The computer program product of claim 16, wherein the computer-readable medium further comprises a seventh set of codes for causing a computer processor to receive signals that indicate an occurrence of an error and record the error in test-specific logs.

20. The computer program product of claim 16, wherein the computer-readable medium further comprises a seventh set of codes for causing a computer processor to generate (i) first results for the test that are standardized across a plurality of tests managed by the platform, and (ii) second results that are specific to the test.

* * * * *